United States Patent [19]
Yoon

[11] Patent Number: 5,584,116
[45] Date of Patent: Dec. 17, 1996

[54] METHOD FOR FABRICATING A MAGNETIC HEAD

[75] Inventor: Sang Y. Yoon, Kyungki-do, Rep. of Korea

[73] Assignee: Goldstar Co., Ltd., Seoul, Rep. of Korea

[21] Appl. No.: 303,960

[22] Filed: Sep. 9, 1994

[30]     Foreign Application Priority Data

Sep. 10, 1993 [KR]   Rep. of Korea ................. 18278/1993

[51] Int. Cl.$^6$ ....................................................... G11B 5/42
[52] U.S. Cl. ..................................... 29/603.14; 29/603.15; 29/603.21
[58] Field of Search ............................. 29/603.02, 603.14, 29/603.15, 603.13, 603.21; 360/125, 126

[56]           References Cited

U.S. PATENT DOCUMENTS 5,353,183  10/1994  Olson .................................. 29/603 X

FOREIGN PATENT DOCUMENTS

61-233405  10/1986  Japan .
63-102007   5/1988  Japan .

Primary Examiner—Carl E. Hall
Attorney, Agent, or Firm—Finnegan, Henderson, Farabow, Garrett & Dunner, L.L.P.

[57]           ABSTRACT

A method for fabricating a magnetic head includes providing a plurality of magnetic or non-magnetic substrates, forming a plurality of parallel V-shaped grooves symmetrically on two sides of each of the substrates, forming laminated magnetic films by depositing soft magnetic alloy films and insulation films alternately on the two sides of each of the substrates and depositing bonding glass on the laminated magnetic films, stacking the plurality of substrates to form a block, carrying out high temperature bonding on the block of substrates with bonding glass material inserted between the V-shaped grooves or a rectangular bonding glass plate placed on a side surface of the V-shaped groove, cutting the block of stacked substrates to obtain a plurality of core blocks including I-core and C-core blocks, the I-core and the C-core blocks having surface faces and tracks, lapping the surface faces of the I-core and the C-core blocks, forming a winding groove and a glass reinforcement groove on a surface of the C-core block, depositing a non-magnetic material on the surface faces of the I-core and C-core blocks, matching the tracks of the I-core and C-core blocks and inserting glass bars in the winding groove and the reinforcement groove, carrying out high temperature bonding on the I-core and C-core blocks, and cutting the high temperature bonded bars into unit sizes.

7 Claims, 10 Drawing Sheets

METHOD FOR FABRICATING A MAGNETIC HEAD

BACKGROUND OF THE INVENTION

1. Field of the Invention

This invention relates to a method for fabricating a laminated magnetic head and, more particularly, to a method for fabricating a magnetic head for improving product yield during machining of core blocks by increasing a bonding force between substrates and laminated magnetic film.

2. Background of the Invention

Video cassette recorders (VCRs) for broadcasting as well as for home use require recordings having high picture quality and high density. Accordingly, magnetic heads for high picture quality VCRs for S-VHS and HDTV in the market use alloy magnetic films of sendust amorphous Fe-Al series alloys and Co-Ta-Zr alloy having a high saturated magnetic flux density deposited on a ferrite or a non-magnetic ceramic substrate. Therefore, the magnetic head employing such an alloy magnetic film can operate with a metal tape having a high coercive magnetic force.

However, in general, such an alloy magnetic material prevents high frequency magnetic field from penetrating deep into the depths of the core and the high frequency magnetic field concentrates on the surface due to a low electric resistance of the alloy magnetic material. That is, a problem of low magnetic permeability exists due to a development of an eddy current. Such a problem is solved by laminating alloy magnetic films and non-magnetic material alternately.

Figure 1A:
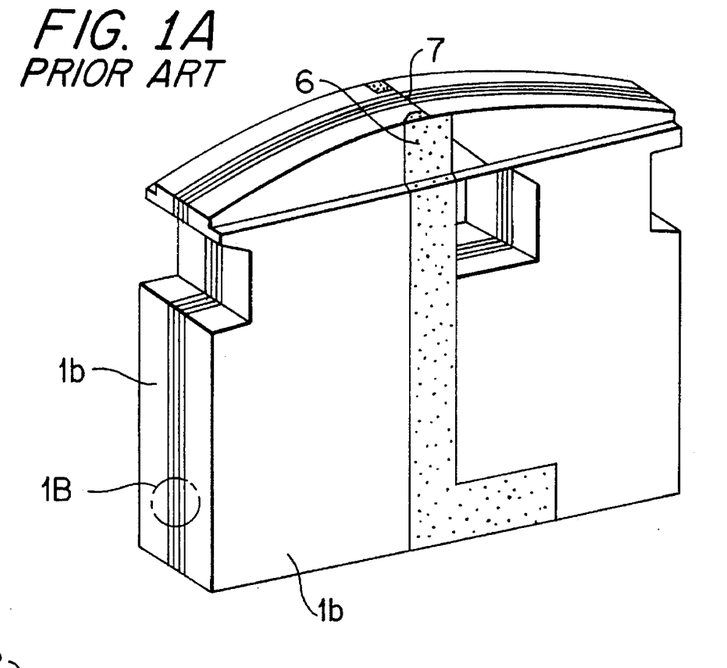
FIG. 1A is an overall perspective view.
Figure 1B:
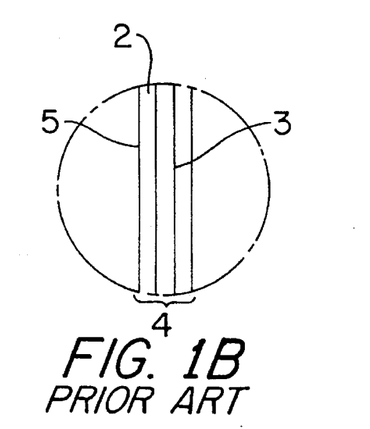
FIG. 1B is an enlarged plain view of the magnetic film.
Figure 1C:
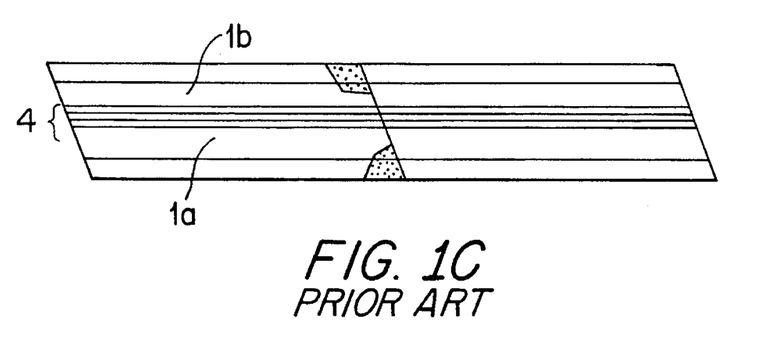
FIG. 1C is an enlarged view, FIG. 1A' is an enlarged plan view of the magnetic film, of the sliding surface in FIG. 1A.

FIGS. 1A, 1A', 1B and 1C show a laminated magnetic head, presently in use, formed from using the foregoing method. The laminated magnetic head includes a laminated magnetic film 4 having soft magnetic alloy films 2 and insulation films 3 of $SiO_2$ laminated alternately on a non-magnetic substrate 1a, and a substrate 1b bonded to the substrate 1a, formed through the above process with bonding glass 5. Reference number 7 is a gap and reference number 6 is glass.

Figure 2A:
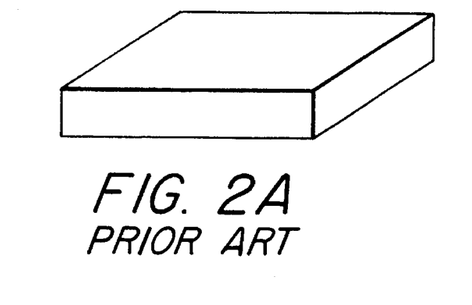
Figure 2B:
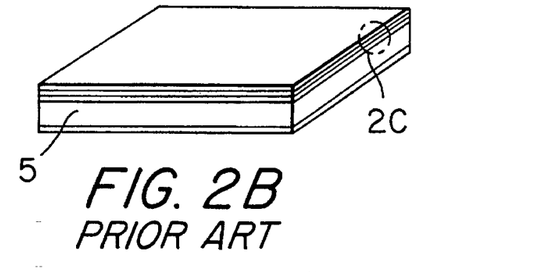
Figure 2C:
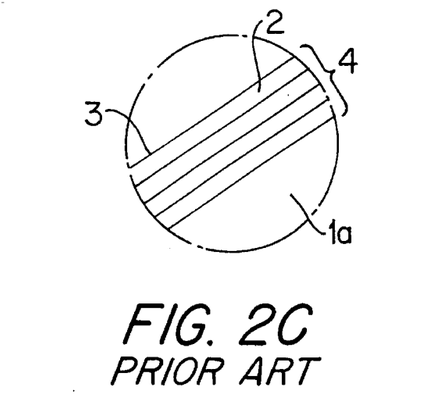

FIGS. 2A to 2K illustrate processes for fabricating the magnetic head. The laminated magnetic film 4 is formed by laminating the soft magnetic alloy films 2 and the insulation films 3 alternately to a thickness of a track width on a non-magnetic substrate as shown in FIG. 2A, both sides of which have been lapped or polished. A thin film of bonding glass 5 is coated on the other side of the lamination, as shown in FIGS. 2B and 2C.

Figure 2D:
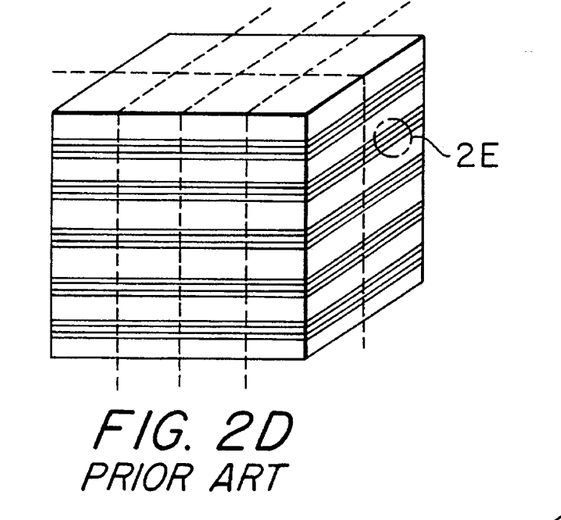
Figure 2E:
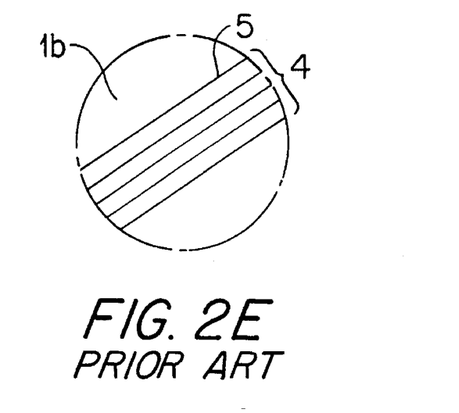
Figure 2F:
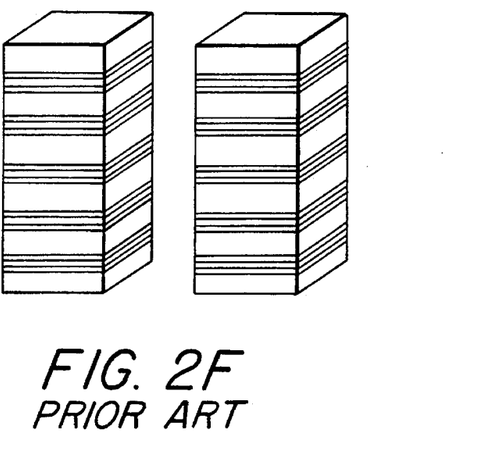
Figure 2G:
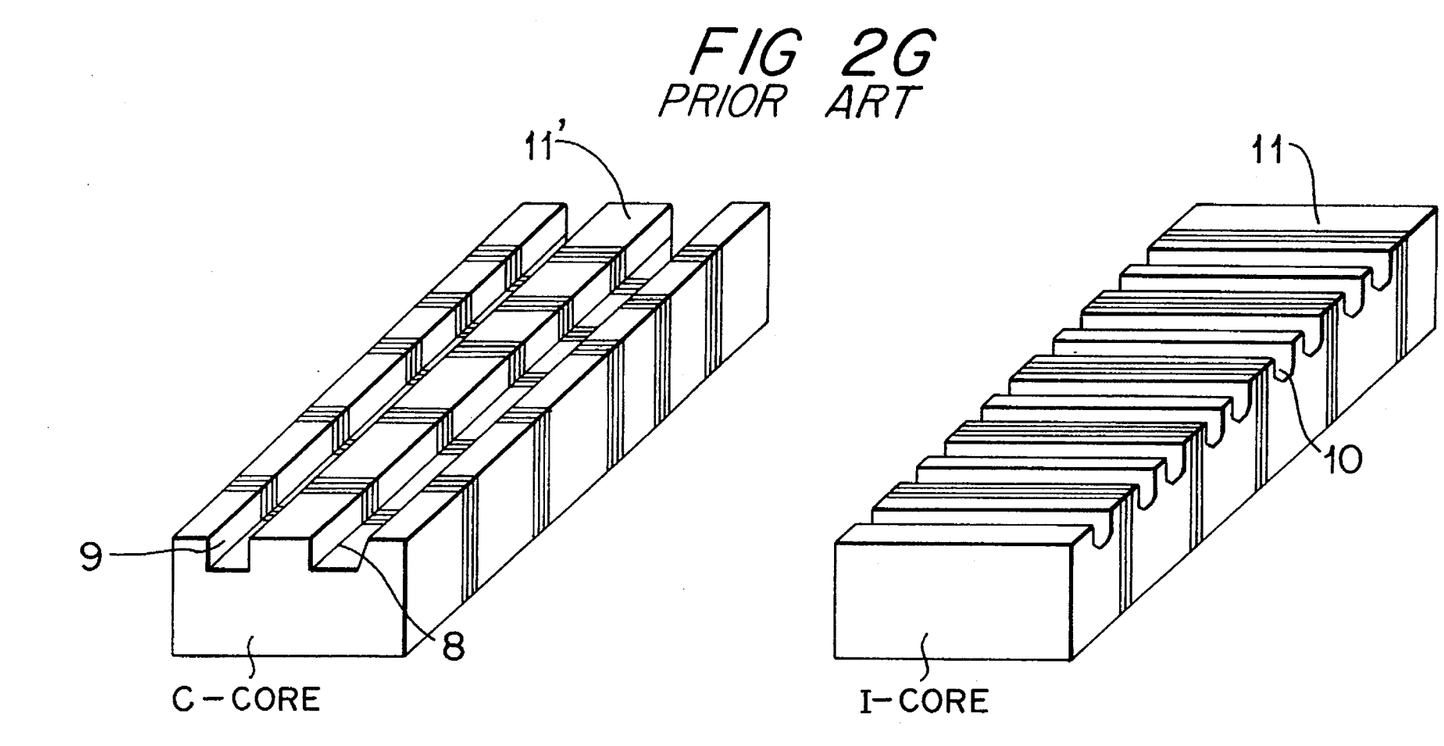

A plurality of the substrates formed through the foregoing process are stacked, as shown in FIGS. 2D and 2E, bonded at high temperature, cut, and ground to form a plurality of core blocks, as shown in FIG. 2F. Next, as shown in FIG. 2G, a winding groove 8 and a reinforcement groove 9 for inserting glass are formed in a C-core block, and glass filling grooves 10 for strengthening the bonding force when bonding with the C-core block are formed in an I-core block.

Figure 2H:
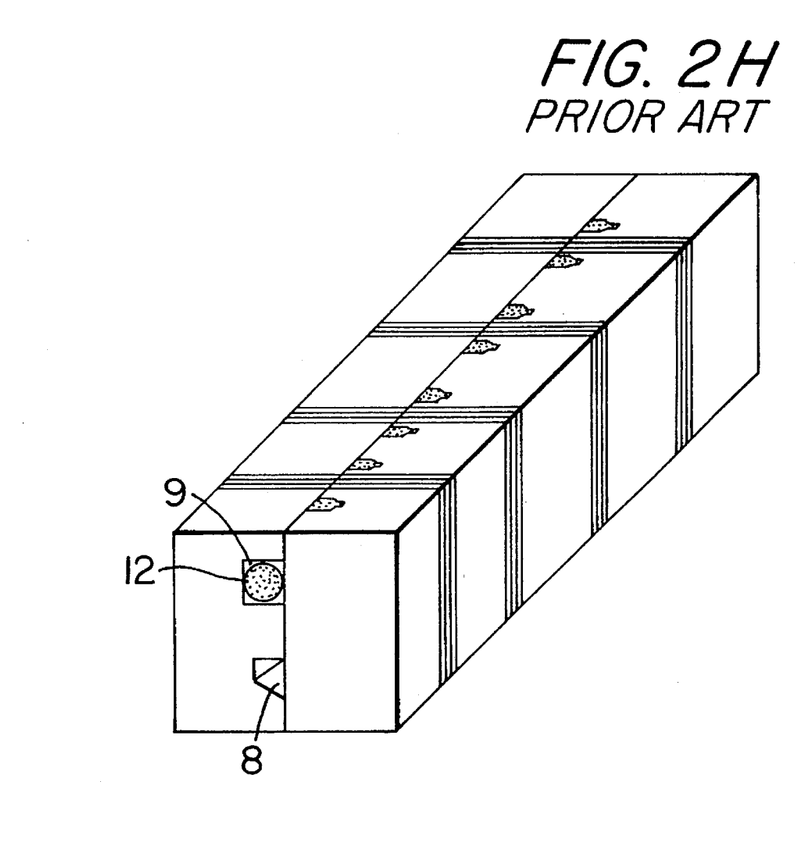
Figure 2I:
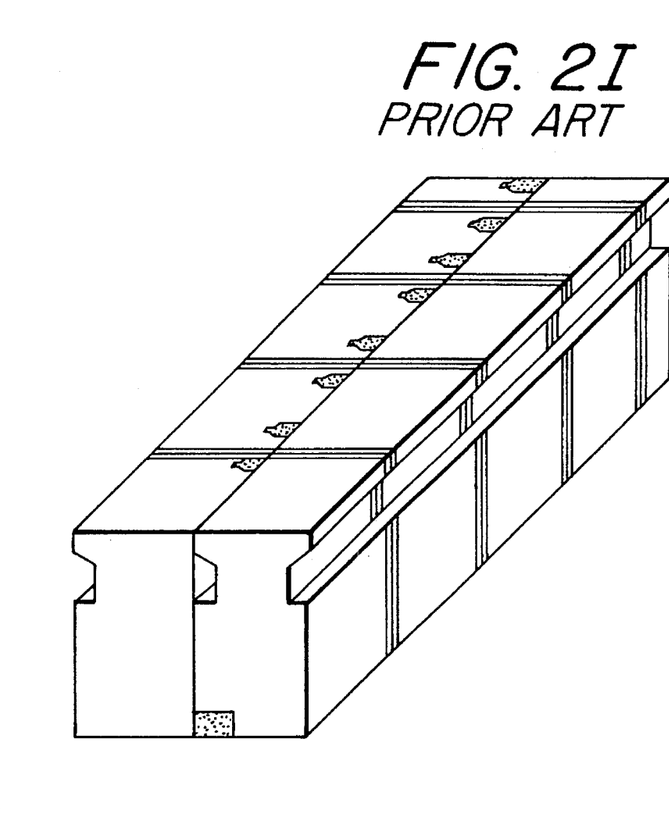
Figure 2J:
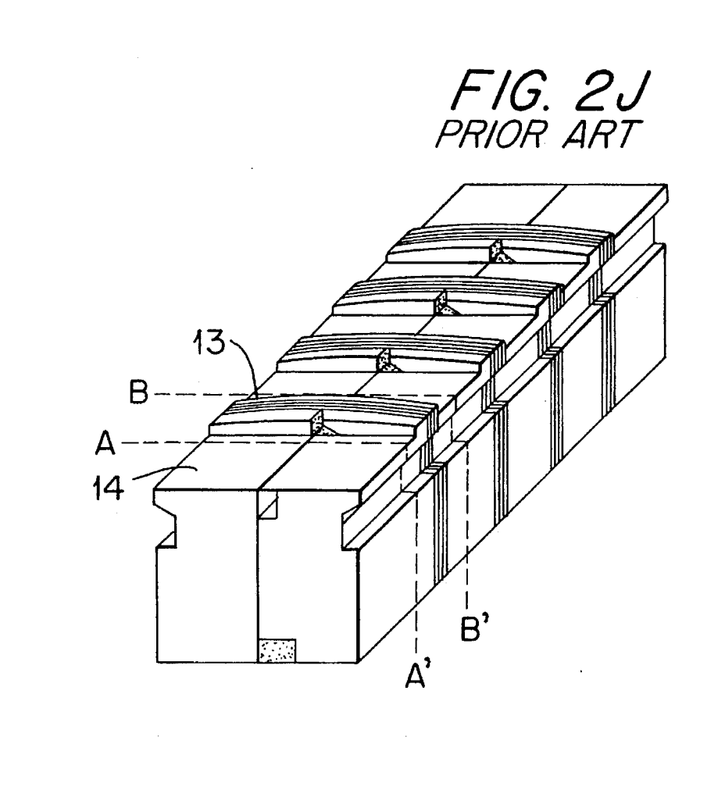

Then, tracks of the I-core and the C-core blocks are matched and bonded by placing the surface faces 11 and 11' of the I-core and the C-core blocks respectively together with non-magnetic material, such as $SiO_2$, deposited to form a gap length on the surface faces 11 and 11' of the I-core and C-core blocks, respectively. As shown in FIG. 2H, glass bars are inserted into the winding groove 8 and the glass reinforcement groove 12, which are subjected to a high temperature heat treatment for melting and bonding to obtain a glass bonded bar.

Figure 2K:
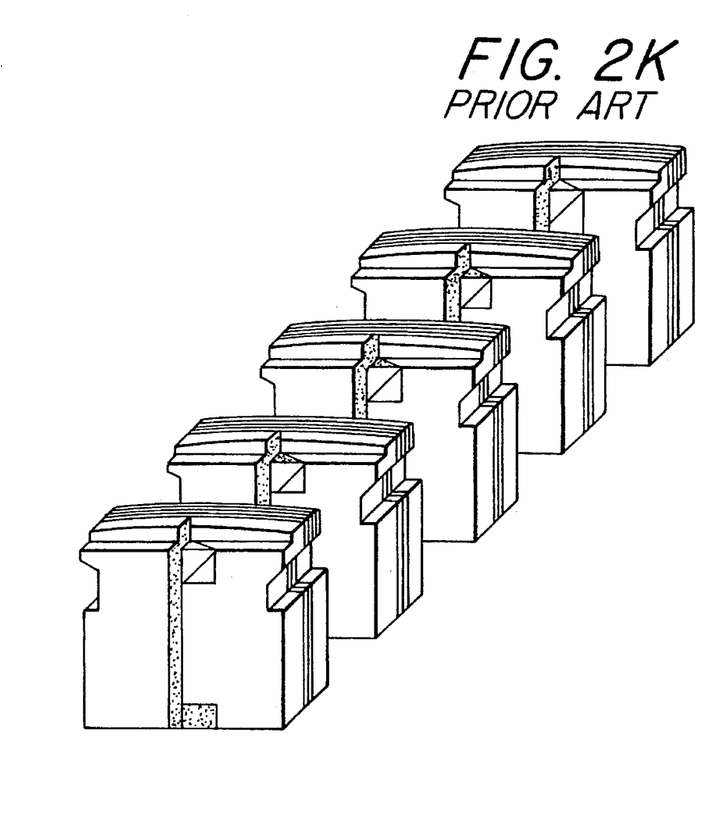

Subsequently, by forming outside winding grooves (FIG. 2I), Carrying out R grinding 13 and step grinding 14 of the sliding surface to improve contact with the tape (FIG. 2J), and cutting along dotted lines A–A' and B–B', the magnetic head core chips, shown in FIG. 1 and 2K, can be obtained.

However, in the foregoing conventional fabrication method, the bonding force becomes weak due to a difference in the thermal expansion coefficient for one another and affinity for the substrate, for example, when the bonding glass between the laminated magnetic film 4 and the non-magnetic substrate 1b is bonding.

Accordingly, substrate 1b can fall from the laminated magnetic film 4 during the machining of the core blocks, causing the product yield to decrease.

SUMMARY OF THE INVENTION

The object of the present invention is to solve the problems of the conventional processes and to provide a magnetic head for improving the production yield during the machining of core blocks by improving a bonding force between the substrate and the laminated magnetic film through forming a plurality of V-shaped grooves on both sides of the substrate, forming a laminated magnetic film in the V-shaped grooves, and filling bonding glass in the V-shaped grooves.

To achieve the objects and advantages of the present invention, a method is provided for fabricating a magnetic head including a first process for forming a plurality of parallel V-shaped grooves symmetrically on both sides of a magnetic or a non-magnetic substrate, a second process for forming a laminated magnetic film by depositing soft magnetic alloy films and insulation films alternately on both sides of the substrate including the V-shaped grooves and depositing bonding glass on the laminated magnetic film, a third process for pressing a stack of a plurality of the blocks formed through the foregoing processes and carrying out high temperature bonding of the blocks with bonding glass bars inserted between the facing V-shaped grooves or a rectangular bonding glass plates placed on the V-shaped groove surface, a fourth process for cutting the stacked blocks to obtain a plurality of core blocks, a fifth process for carrying out lapping of the surface faces of an I-core and a C-core, which are the core blocks obtained through the foregoing processes, forming a winding groove and a glass reinforcement groove in the surface face of the C-core block, and depositing non-magnetic material as long as a gap length on the surface faces of both cores obtained through the foregoing processes, a sixth process for carrying out a high temperature bonding of both cores after matching tracks of both cores by putting the surface faces together and inserting glass bars in the winding groove as well as in the reinforcement groove, and a seventh process for cutting and machining the high temperature bonded bars into unit sizes.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments of the invention and, together with the description, serve to explain the features, advantages, and principles of the invention.

BRIEF DESCRIPTION OF THE DRAWINGS

In the drawings,

FIGS. 1A and 1C are a perspective view of a conventional magnetic head, in which

FIGS. 2A to 2K illustrate processes for fabricating the conventional magnetic head;

FIGS. 3A to 3I illustrate processes for fabricating a magnetic head in accordance with the present invention;

FIGS. 4A and 4B are a perspective view of a magnetic head in accordance with the present invention, in which

DETAILED DESCRIPTION OF THE INVENTION

This invention is to be explained in detail hereinafter, referring to the attached drawings.

Figure 3A:
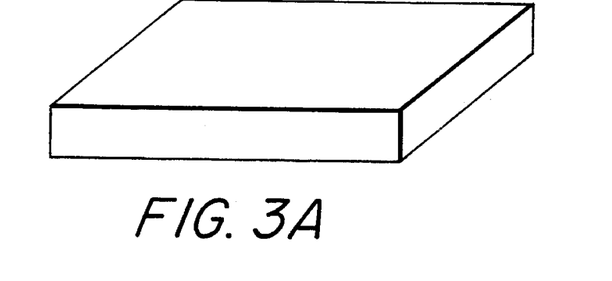

FIGS. 3A to 3I illustrate processes for fabricating the magnetic head in accordance with the present invention. As shown in FIG. 3A, a non-magnetic substrate 1a is prepared having both surfaces thereon lapped or polished to a mirror surface.

Figure 3B:
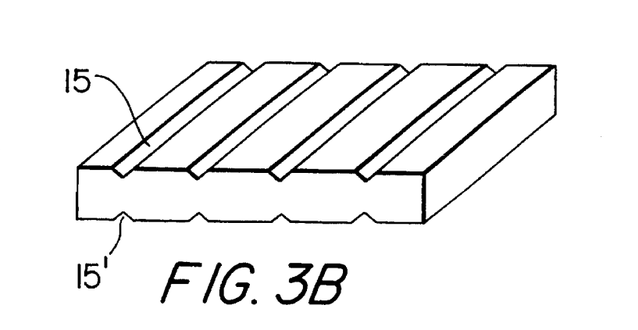
Figure 3C:
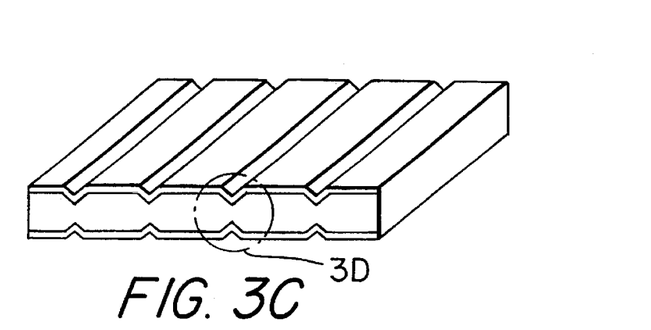
Figure 3D:
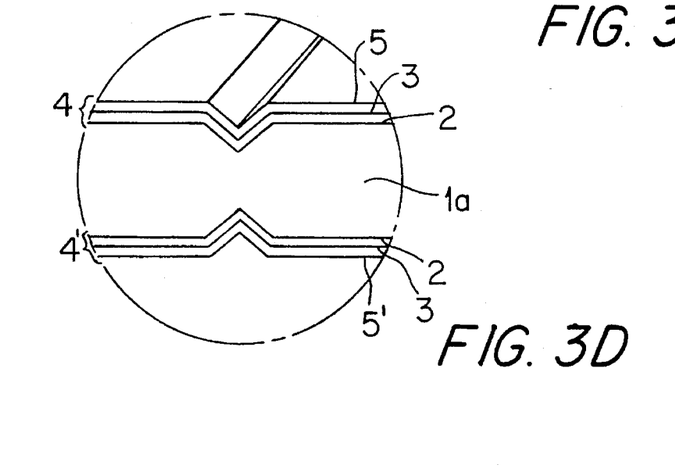

As shown in FIG. 3B, a plurality of parallel V-shaped grooves 15 and 15' are formed symmetrically on both sides of the substrate 1a. As shown in FIGS. 3C and 3D soft magnetic alloy films 2 of sendust or amorphous and insulation films 3 of non-magnetic material ($SiO_2$, $Al_2O_3$, or Cr) are laminated alternately on both sides of the substrate.

Bonding glass 5 and 5' are deposited on resultant laminated magnetic films 4 and 4' to a thickness of about 1000 Å to 5000 Å. The thickness of such films should be such that the sum of the thicknesses of the laminated magnetic film 4 deposited and laminated on one side and the laminated magnetic film 4' deposited and laminated on the other side is the same as the track width of the head core chip.

It is convenient for the fabrication process to deposit, if possible, the thickness of the laminated magnetic film on one side which is half of the track width thickness.

Figure 3E:
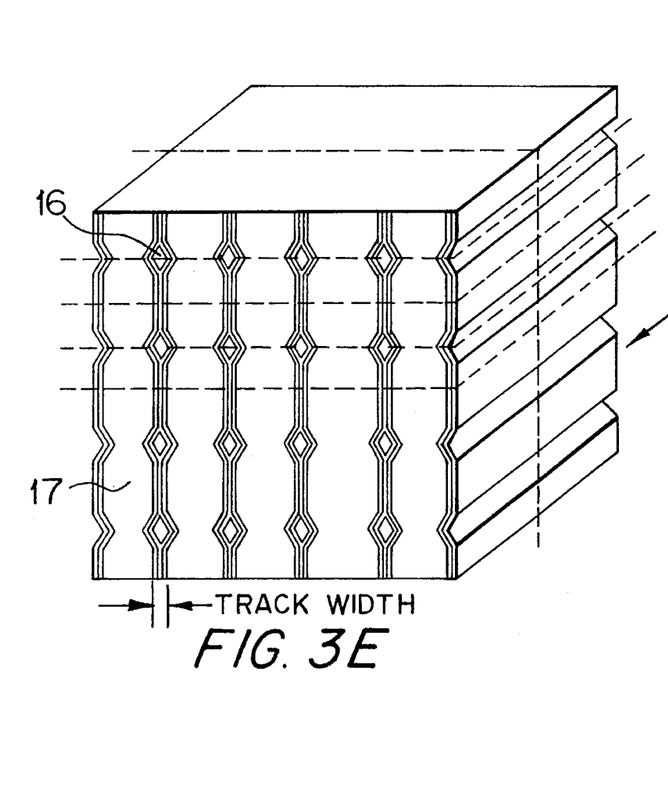
Figure 3F:
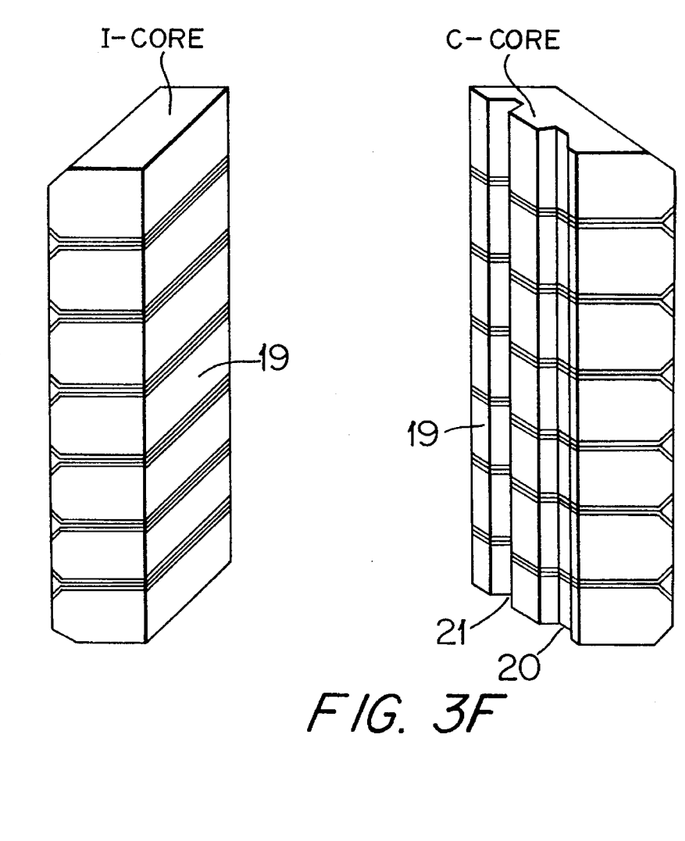

Then, as shown in FIG. 3E, a plurality of stacked substrates formed through the foregoing process are pressed and bonded together using a bonding jig. The grooves are filled with glass from a high temperature heat treatment in a furnace at 550° to 700° C. with bonding glass bars 16 inserted in the appropriate grooves or a rectangular glass plate placed on a surface 17 to melt in the direction of the arrow shown in FIG. 3E. Then the stacked substrates are slowly cooled. The block of stacked substrates bonded through the foregoing process is cut along the dotted lines (FIG. 3E) to obtain a plurality of core blocks including I-core and C-core, as shown in FIG. 3F.

After a precision lapping of the surface faces 19 of the I-core and the C-core, a winding groove 20 and a glass reinforcement groove 21 are formed on the surface faces of the C-core block. Then, a thin film of non-magnetic material, such as $SiO_2$, is formed on the surface faces 19 having a length as long as a gap length using a sputter, for example, for forming a gap.

Figure 3G:
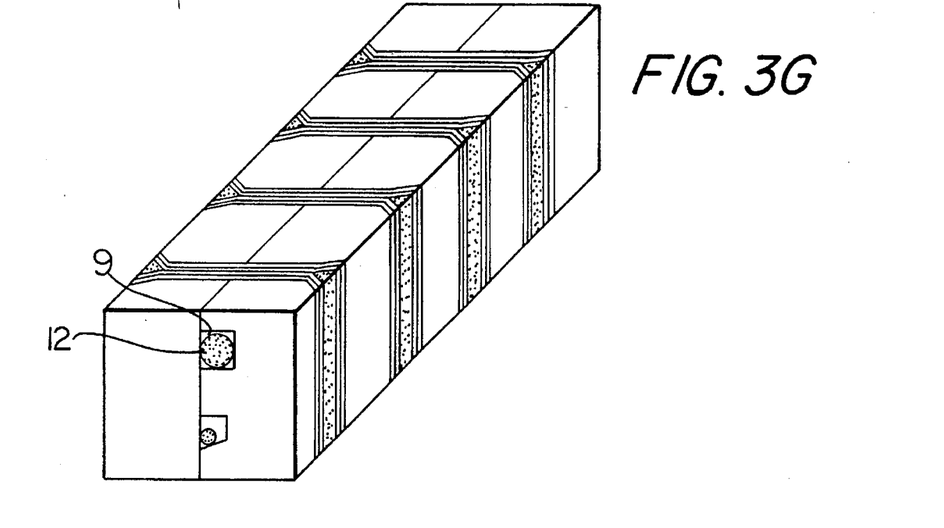

As shown in FIG. 3G, after the surface faces are joined together by matching the tracks and bonding glass bars 22 are inserted, the I-core and C-core blocks are placed in a high temperature furnace and heated at about 600° C. to melt and bond.

Figures 3H, 3I:
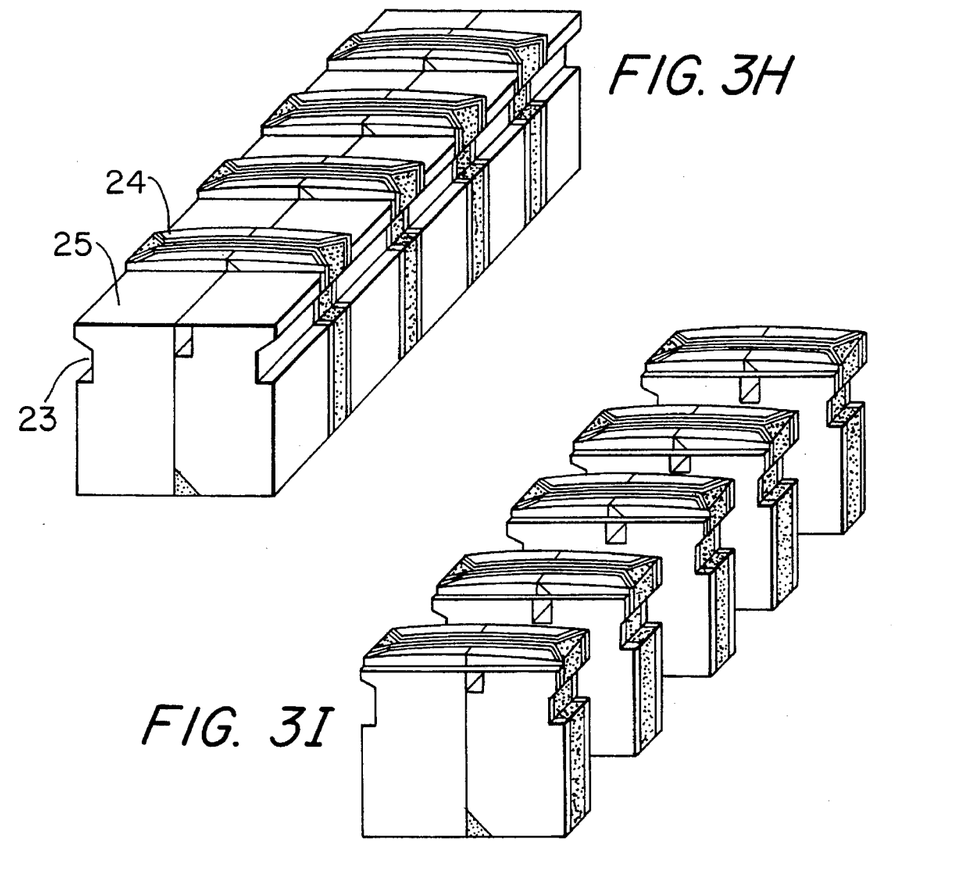
Figure 4A:
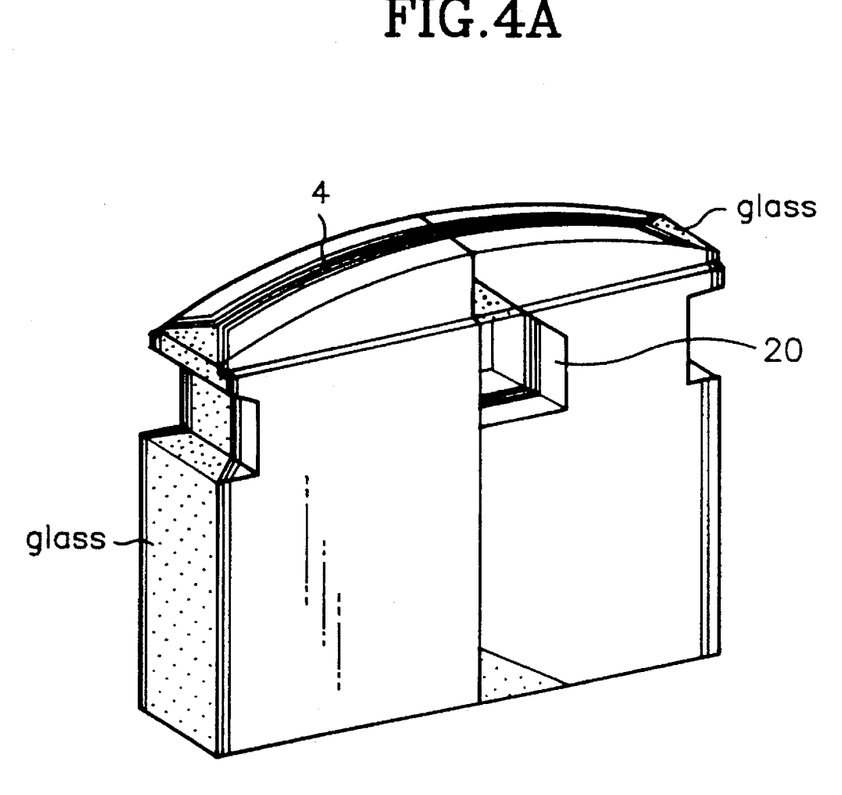
FIG. 4A is an overall perspective view and FIG. 4B is an enlarged view of the sliding surface in FIG. 4A.
Figure 4B:
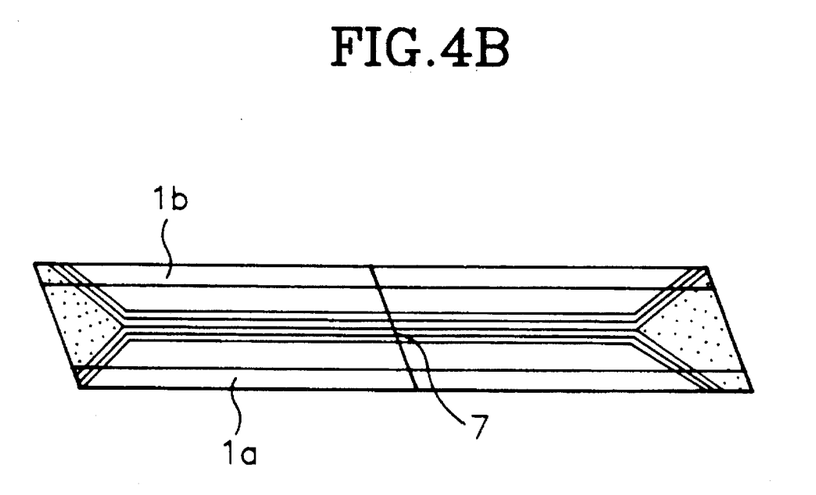

As shown in FIG. 3H, outer winding grooves 23 are formed on the resultant bonded bar for a winding coil, R grinding 24 and step grinding 25 to improve contact with a tape. The bonded bar is cut in a desired azimuth angle, as shown in FIG. 3I, to finally obtain head core chips of the present invention, as shown in FIG. 4.

Figure 5:
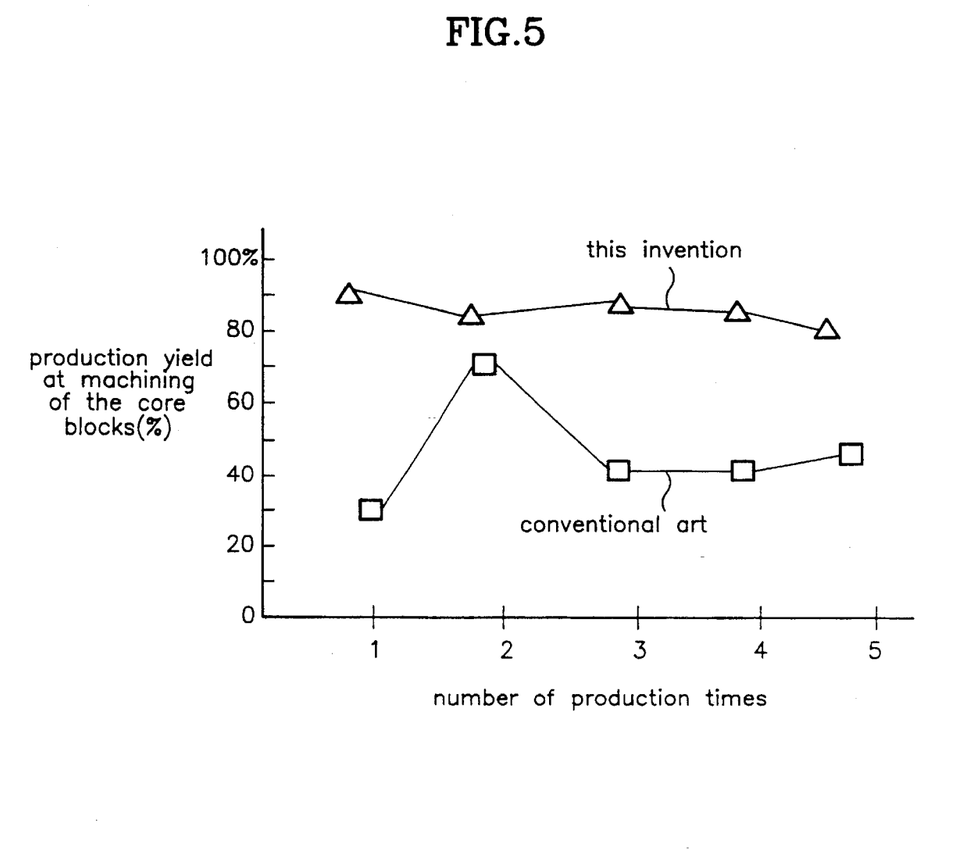
FIG. 5 is a graph showing a comparison of the production yield at machining of the core blocks.

FIG. 5 shows the product yield of the core blocks during machining of the core blocks in accordance with the present invention. As shown in FIG. 5, the product yield for the present invention is excellent and much higher than the conventional one.

As has been explained, the present invention allows a better product yield at the machining of the core blocks by strengthening the bonding force between the substrates 1a and 1b and the laminated magnetic film 4 through forming a plurality of V-shaped grooves on both sides of the substrate, forming a laminated magnetic film in the V-shaped grooves, and filling bonding glass into the V-shaped grooves.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A method for fabricating a magnetic head comprising the steps of:

providing a plurality of substrates;

forming a plurality of parallel V-shaped grooves on two sides of each of the substrates;

forming laminated magnetic films by depositing soft magnetic alloy films and insulation films on said plurality of V-shaped grooves on the two sides of each of the substrates and depositing bonding glass on the laminated magnetic films;

stacking the plurality of substrates to form a block;

inserting bonding glass material between the V-shaped grooves or placing a rectangular bonding glass plate on a side surface of the V-shape grooves;

bonding the block of substrates at a first high temperature with the bonding glass material inserted between the V-shaped groves or the rectangular bonding glass plate placed on a side surface of the V-shaped grooves;

cutting the stacked substrates to obtain a plurality of core blocks including an I-core and a C-core, the I-core and the C-core blocks having surface faces and tracks;

lapping the surface faces of the I-core and the C-core blocks;

forming a winding groove and a glass reinforcement groove on a surface of the C-core block;

depositing a non-magnetic material on the surface faces of the I-core and C-core blocks;

inserting glass bars in the winding groove and the reinforcement groove;

bonding the I-core and C-core blocks at a second high temperature to obtain a bonded bar; and cutting the high temperature bonded bar into unit sizes.

2. The method for fabricating a magnetic head according to claim 1, wherein the plurality of substrates are magnetic or non-magnetic.

3. The method for fabricating a magnetic head according to claim 1, wherein the plurality of parallel V-shaped grooves on the two sides of the substrate are formed symmetrically.

4. The method for fabricating a magnetic head according to claim 1, wherein the soft magnetic alloy films and insulation films are deposited alternately on the two sides of the substrate.

5. The method for fabricating a magnetic head according to claim 1, wherein the I-core and C-core blocks are bonded at the high temperature after matching the tracks of the core blocks.

6. The method for fabricating a magnetic head according to claim 1, wherein the block of substrates are bonded at a range of approximately 550° C. to 700° C.

7. The method for fabricating a magnetic head according to claim 1, wherein the I-core and C-core blocks are bonded at approximately 600° C.

* * * * *

UNITED STATES PATENT AND TRADEMARK OFFICE
CERTIFICATE OF CORRECTION

PATENT NO.   : 5,584,116
DATED        : December 17, 1996
INVENTOR(S)  : Sang Y. YOON It is certified that error appears in the above-indentified patent and that said Letters Patent is hereby corrected as shown below:

In claim 1, col. 4, line 44, "V-shape" should read --V-shaped--; and
           col. 4, line 47, "groves" should read --grooves--.

Signed and Sealed this

Fifteenth Day of April, 1997

Attest:

BRUCE LEHMAN

Attesting Officer                Commissioner of Patents and Trademarks